United States Patent
Jensen

(10) Patent No.: US 7,658,839 B2
(45) Date of Patent: Feb. 9, 2010

(54) DEVICE FOR PURIFYING LIQUID IN A LIQUID RESERVOIR AND A TRANSFORMER PROVIDED WITH SUCH A DEVICE

(75) Inventor: Carl Aage Jensen, Svendborg (DK)

(73) Assignee: C.C. Jensen A/S (DK)

( * ) Notice: Subject to any disclaimer, the term of this patent is extended or adjusted under 35 U.S.C. 154(b) by 428 days.

(21) Appl. No.: 10/493,352

(22) PCT Filed: Oct. 22, 2002

(86) PCT No.: PCT/DK02/00701

§ 371 (c)(1),
(2), (4) Date: Sep. 20, 2004

(87) PCT Pub. No.: WO03/035215

PCT Pub. Date: May 1, 2003

(65) Prior Publication Data

US 2005/0040086 A1    Feb. 24, 2005

(30) Foreign Application Priority Data

Oct. 22, 2001   (DK) ................................ 2001 01548

(51) Int. Cl.
*B01D 19/02* (2006.01)

(52) U.S. Cl. .................... 210/86; 210/120; 210/167.02; 210/188; 210/104; 210/406

(58) Field of Classification Search ................ 210/120, 210/86, 104, 90, 167.02, 188, 97, 406; 208/184–186; 95/242, 248
See application file for complete search history.

(56) References Cited

U.S. PATENT DOCUMENTS

| 2,062,934 | A |   | 12/1936 | Renfrew |
| 3,249,438 | A |   | 5/1966  | Topol |
| 3,675,395 | A | * | 7/1972  | Baranowski ................. 96/159 |
| 3,998,738 | A |   | 12/1976 | Kusay |
| 4,019,977 | A |   | 4/1977  | Hachadoorian et al. |
| 4,549,963 | A |   | 10/1985 | Jensen et al. |
| 5,139,683 | A | * | 8/1992  | Endo et al. ................. 210/744 |
| 5,574,214 | A | * | 11/1996 | Balton et al. ............... 73/61.43 |
| 6,224,716 | B1 |  | 5/2001  | Yoder |

FOREIGN PATENT DOCUMENTS

| DK | 156542     | 9/1989 |
| WO | WO 00/52445 | 9/2000 |

* cited by examiner

*Primary Examiner*—Terry K Cecil
(74) *Attorney, Agent, or Firm*—Scully, Scott, Murphy & Presser, P.C.

(57) ABSTRACT

A device for purifying liquid in a reservoir and including a vacuum chamber (1) having an inflow opening (2) and an outflow opening (3) adapted to communicate with the liquid in the reservoir through a feed conduit (4) and a return conduit (5), respectively. The return conduit (5) is provided with a pump (6) and the vacuum chamber is connected with a vacuum pump (7). The device further includes a filter cartridge (8) provided with a plurality of filter elements, each having a flow side communicating with a central passage (26) and a flow side opening into the periphery of the filter cartridge (8). The filter cartridge (8) is arranged inside the vacuum chamber, the central passage (26) of the filter cartridge communicating with the inflow opening (2) of the vacuum chamber.

4 Claims, 1 Drawing Sheet

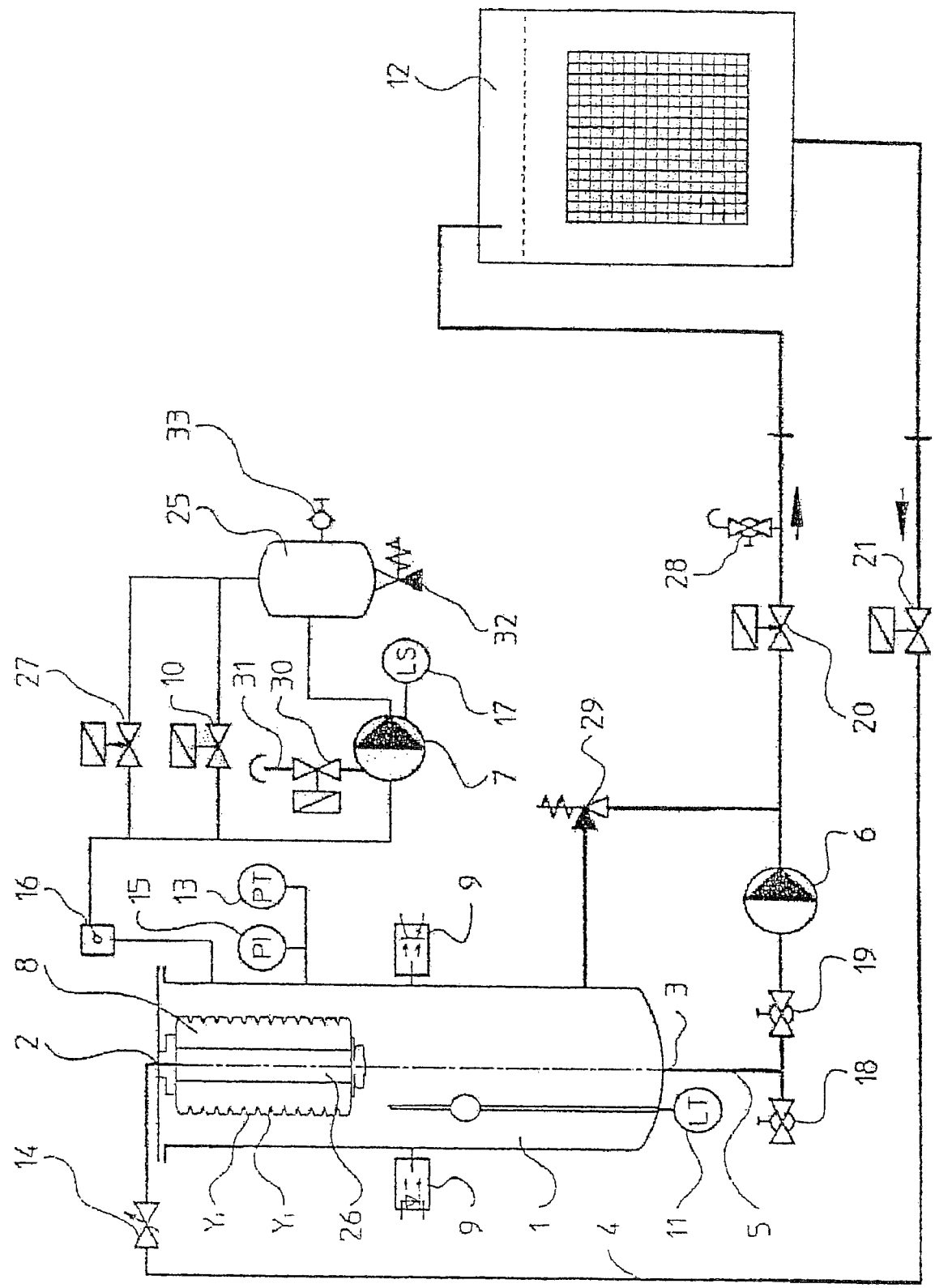

DEVICE FOR PURIFYING LIQUID IN A LIQUID RESERVOIR AND A TRANSFORMER PROVIDED WITH SUCH A DEVICE

TECHNICAL FIELD

The invention relates to a device for purifying liquid in a liquid reservoir, said device including a vacuum chamber having an inflow opening and an outflow opening adapted to communicate with the liquid in the reservoir through a feed conduit and a return conduit, respectively, a pump arranged in the return conduit, a vacuum pump connected with the vacuum chamber, and a filter cartridge provided with a plurality of filter elements, each having a flow side communicating with a central passage and a flow side opening into the periphery of the filter cartridge, and where the filter cartridge is arranged inside the vacuum chamber, the central passage of the filter cartridge communicating with the inflow opening of the vacuum chamber.

A high-voltage transformer is a well-known component, which is widely used as part of the power supply network and as a vital part of the high-voltage electricity grid. High-voltage transformers may for instance also be used in factories to step up or step down the supply voltage according to need. A high-voltage transformer is formed of five essential components, ie. an iron core, a winding, an insulating material, a coolant and a casing. It further comprises a number of other components which, however, do not determine the basic function. The iron core is typically a silicon iron alloy rolled into thin sheets of a thickness of between 0.3-0.5 mm, said plates being stamped into a suitable shape and assembled into an iron core. Usually the winding in the high-voltage transformer is a copper winding, but an aluminium winding may also be used even though this is an unusual choice. The winding in the high-voltage transformer is insulated. The insulating material may be made different types of materials, but it is typically made of paper wound round the conductors in the winding. Various materials may be used as coolant in a high-voltage transformer, but either air or oil is commonly used. Air is a poor coolant due to its low specific heat capacity and low heat transfer coefficient for which reason air is usually only used in small high-voltage transformers or under special conditions. Oil is far more often used as coolant. It is very effective coolant, the specific heat capacity and the heat transfer coefficient thereof being superior to those of air. The object of the casing of a high-voltage transformer is of course to enclose the iron core and the winding, but in addition thereto the casing serves as a tank for the transformer oil. Furthermore bushings are provided in the casing for the inlet and outlet lines of the winding as well as various pressure relief valves. Gauges may also be provided in the casing.

As mentioned above the transformer oil serves as a coolant for the high-voltage transformer. However, this is not the only function of the transformer oil, as the transformer oil also constitutes a vital part of the transformer insulation. As an example thereof, transformer oil has a dielectric constant, $\in_r$, between two and three unlike air or vacuum which have a dielectric constant of one. Another factor characteristic of the transformer oil is the voltage at which voltage breakdown occurs. A voltage breakdown is caused by an arc arising through the transformer oil between two conductors or between a conductor and the casing. The voltage of transformer oil at which voltage breakdown occurs is typically about 150 kV/cm. However many other factors influence the breakdown voltage size, eg. a water content of a merely 0.01% in oil reduces the breakdown voltage by 20%. Another factor, which may significantly reduce the breakdown voltage, is the presence of contaminating particles or suspended gasses (bubbles) in the transformer oil. These contaminating elements occur as electric dipoles and tend to create bridges between conducting parts at different electrical potentials. As a result the bridges form a possible path for an arc and thus contribute to reducing the breakdown voltage. The breakdown voltage in an extremely pure transformer oil is as high as 1000 kV/cm. However, in practice it is impossible to maintain such a transformer oil purity in a high-voltage transformer.

Several reasons exist as to why the oil in a high-voltage transformer becomes contaminated. Oil is filled into the transformer at the manufacture of the high-voltage transformer. If suitable precautions are not taken, the oil becomes contaminated. Even though contamination cannot be avoided completely, much is done to minimize contamination during all types of manufacturing processes of high-voltage transformers, eg by ensuring that the transformer is substantially free of particles and dry before being filled with oil. It is, however, also necessary inter alia to take both relative and the absolute humidity into account during the feeding of oil.

The oil is further contaminated during service of the high-voltage transformer. Despite being properly dried before the oil is filled into the transformer, the paper insulation of the transformer windings contains an amount of water. The actual water content in paper insulation depends on several factors including the temperature. In service, a high-voltage transformer suffers an energy loss, partly in form of a resistive drop in the transformer winding and partly as an iron loss caused by the conversion of electrical energy to magnetic energy and back to electrical energy. Ultimately the energy loss causes a temperature change in the high-voltage transformer. Since the size of this energy loss varies according to the load, the temperature changes over time. Consequently, when the high-voltage transformer switches from being loaded to running idle a situation may arise in which the temperature drops to a point at which the paper and the oil cannot contain the absorbed water, whereby free water is formed in the oil. Another factor is the variations in the temperature and the possible presence of oxygen which cause the transformer oil and the paper insulation to age. Ageing is the disintegration of a material and may thus cause the formation of decomposition products in the oil in form of particles, gases and water.

As mentioned above, the presence of water, particles or gas bubbles in the transformer oil is undesirable, for which reason filtering of the transformer oil is required. The oil in a high-voltage transformer is typically cleaned by means of one of the two methods below. In one method, which has been used for a number of years, the oil is drained out of the high-voltage transformer and moved to an oil treatment system or to move an oil cleaning system to the high-voltage transformer and to pass the oil through the system. However, this method is encumbered by the significant drawback that in order to treat the oil the high-voltage transformer has to be taken out of service for some time. In another method, which is used nowadays for the treatment of oil, a filter is secured to the high-voltage transformer and through which the oil circulates continuously, while the transformer is in service.

It is thus commonly known to filter a liquid, while the plant, in which the liquid is used, is in service. It is inter alia known to provide a filter for removing contaminat-ing elements from the lubricating oil in connection with a lubricating device of a combustion engine in a car. It is also known to use water traps to remove water for instance from diesel oil for a diesel engine. The necessary purification process of transformer oil differs from that of for instance lubricating oil by the degree of purity required in connection with transformer oil.

BACKGROUND ART

U.S. Pat. No. 3,249,438 discloses an apparatus for removing contaminants e.g. water from a fluid such as oil. The apparatus comprises filters placed inside a vacuum chamber, and the combination of the vacuum and oil film on the outside surface of the filters removes water from the oil in the form of a vapour. The vapour is thereafter removed from the vacuum chamber. There are not described means for controlling liquid foam in the vacuum chamber.

U.S. Pat. No. 6,224,716 discloses an apparatus much like U.S. Pat. No. 3,249,438 but it also comprises a heating circuit for the oil to speed up the evaporation of the water from the oil. There are described pumps and valves for feeding liquid to the vacuum chamber and removing liquid from the vacuum chamber. There are not described means for controlling liquid foam in the vacuum chamber.

U.S. Pat. No. 5,574,214 discloses an apparatus for the treatment of transformer oil, in which the oil is treated by being passed through a vessel containing a conventional filter material and a molecular sieve. A molecular sieve is a material which is able to retain molecules of a specific molecular weight. The conventional filter material thus removes the particles from the transformer oil and the molecular sieve removes the water. This method is disadvantageous in that over time the molecular sieve is exhausted and has to be replaced.

International publication No WO 00/52445 discloses an apparatus, in which a filter cartridge is used to filter the transformer oil. The filter cartridge contains a filter material such as Fuller's earth. Fuller's earth is a type of soil, which inter alia is used as cat litter, and which possesses the ability to absorb water very easily. This device is encumbered by the same drawback as the above US patent, ie that the filter material is exhausted and has to be replaced occasionally. The WO publication further discloses a vessel provided with a vacuum pump, which is used to minimise the gas suspension in the transformer oil.

U.S. Pat. No. 2,062,934 describes a filter system where the liquid flows through disk-like filter elements from the outside of the filter elements to the inside, and where the filter elements are placed inside a vacuum chamber. It is mentioned that the liquid is the oil from a transformer and that the system removes water from the oil.

U.S. Pat. No. 6,224,716 describes a filter system for lubricating oils where cylindrical, coalescent filter units are placed in a vacuum chamber and where heated oil is passed from the inside of the filter units to the outside. It is specifically mentioned that the system can remove water from the oil.

DK patent No 156542 discloses a filtering device comprising a plurality of stacked filtering elements forming a filter cartridge. The disc-shaped filtering elements each has a central aperture forming a central passage with apertures to the inner cavity of the individual filtering elements in the stacked position of the filtering elements. Typically, the central passage has an inlet opening at one end and an opening sealed by means of a plug at the other end. Each filtering element has a planar outer side adjacent the central aperture and a corrugate side. As a result each pair of filtering elements opens into the central passage on one side, while closely abutting the adjacent pair of filtering elements on its inner side.

DESCRIPTION OF THE INVENTION

The device according to the invention is characterised in that the filter cartridge is arranged inside the vacuum chamber, the central passage of the device communicating with the inflow opening of the vacuum chamber.

The resulting device ensures an effective continuous removal of contaminating particles from the liquid and removal of the water present in the liquid, the liquid being evacuated from the reservoir by means of the vacuum pump and into the central passage and then out passed through the filter elements and onto the surface of the filter cartridge, whereby a large liquid surface is formed. The particles in the liquid are filtered off by means of the filter cartridge. The flow of liquid onto the surface of the filter cartridge and the low pressure in the vacuum chamber reduce both the solubility of water in the liquid and boiling point of the water. As a result water is discharged as free water in the liquid and then boiled off from the liquid. All components of the device except the filter cartridge are not exhausted resulting in a long life span of the device. The liquid is pumped back to the reservoir from the bottom of the vacuum chamber.

The filter cartridge known from DK patent No 156542 may advantageously be used.

The boiling-off of the water from the liquid may cause the formation of foam due to the low pressure in the vacuum chamber. This is a disadvantageous effect, as the foam may inter alia escape to the vacuum pump. According to the invention a first sensor for monitoring the foam level has consequently been provided in the vacuum chamber. If the foam exceeds a specific level, a pressure equalizing valve is opened and the pressure in the vacuum chamber is increased due to the inflowing gas.

According to the invention the vacuum pump may be connected to a vessel adapted to accumulate the gas being drawn out of the vacuum chamber, said vessel communicating with the pressure-equalising valve through a conduit. The accumulated gas may advantageously be used for checking the condition of the transformer, especially if the oil stems from a transformer. This test may inter alia provide information about the expected remaining life of the transformer oil and of the insulating materials in the transformer or indicate the fault source at faults or breakdowns.

The invention also relates to a transformer characterised in that it includes a device of the above type, in which the oil reservoir is the oil in a transformer. As mentioned above a device of this type is suitable for removing impurities from a liquid such as a transformer oil. The transformer oil is thus cleaned continuously and any operation-interrupting contaminating elements are kept to a minimum resulting in increased system reliability.

BRIEF DESCRIPTION OF THE DRAWING

The invention is explained in detail below with reference to the drawing, which is a principle drawing showing all of the essential components of invention.

BEST MODES FOR CARRYING OUT THE INVENTION

The device shown on the drawing for purifying a liquid in a reservoir 12 includes a vacuum chamber 1 having an inflow opening 2 and an outflow opening 3, a vacuum pump 7, a filter cartridge 8, a feed conduit 4 and a return conduit 5. The filter cartridge 8 is of the type mentioned in DK patent No. 156542. As indicated in the drawing, the filter cartridge 8 includes a plurality of filter elements $y_i$. The liquid is passed from the reservoir 12 through a feed conduit 4 to an inflow opening 2 in the vacuum chamber 1 and from there into the central passage 26 in the filter cartridge 8. The vacuum pump 7 serves to maintain a low pressure in the vacuum chamber 1, the low pressure evacuating the liquid from the reservoir 12 into the vacuum chamber 1. The liquid then flows from the inner face of the filter cartridge 8 to the outer face of the filter cartridge 8 and drips to the bottom of the vacuum chamber 1, from where a pump 6 pumps the liquid out of the vacuum chamber 1 through the outflow opening 3 and the return conduit 5 back to the reservoir 12.

By passing the liquid from the inner face to the outer face of the filter cartridge 8 two features are obtained, viz. the filter material filters off the particle contamination from the liquid and a liquid film having a large surface is formed on the outer face of the filter cartridge 8. The particles retainable by the filter cartridge 8 depend on the filter material, particles of a specific minimum size being allowed to pass freely therethrough. The provision of a large liquid film surface on the outer face of the filter cartridge 8 allows for the optimum liquid amount to be subjected to the low pressure in the vacuum chamber one. The water in the liquid on the surface of the filter cartridge 8 is boiled off of the liquid, even when the liquid temperature considerably below 100° C.'s at which temperature water boils at 1 ATM. The gaseous water is then evacuated from the vacuum chamber 2 by means of the vacuum pump seven.

The boiling-off of water from the liquid causes the formation of foam due to the gas bubbles in the liquid on the outer face of the filter cartridge 8. Together with the liquid the foam drips to the bottom of the vacuum chamber 1 and accumulates on top of the liquid. This constitutes a problem, in particular if the foam reaches such a high level that it comes into contact with the vacuum pump 7. A first sensor 9 has thus been provided in the vacuum chamber 1 for monitoring the foam level. A pressure equalising valve 10 is provided to reduce the foam level in the vacuum chamber 1 said valve equalising some of the pressure in the vacuum chamber 1 when an excessive foam level is recorded by the first sensor. The pressure equalisation is effected by the pressure equalising valve 10 allowing gas to flow into the vacuum chamber 1, whereby the foam disintegrates.

Furthermore as mentioned above, the gas present in the transformer oil is used for analysing the condition of the transformer, eg by indicating possible fault sources and estimating the remaining life of the transformer. A vessel 25 for receiving the gas from the vacuum chamber 1 is provided in connection with the vacuum pump 7. As a result it is possible to continuously analyse the gas to detect any possible fault conditions or to analyse the gas in connection with a breakdown in order to locate the cause of the breakdown.

The mixture of water and gases evacuated from the vacuum chamber 1 may condense in the sump of the vacuum pump 7. In order to prevent such a condensation air is supplied to the suction side of the pump 7 through the closing valve 30 and the paper filter 31.

The mixture of water and gases is passed to a vessel 25 from the outflow opening of the vacuum pump 7. This vessel is provided with a sampling valve 33 and a pressure equalising valve 32. The pressure equalising valve 32 serves to maintain a specific differential pressure between the vessel 25 and the surroundings.

The vessel further communicates with the pressure control valve 27 and the pressure equalising valve 10. The purpose of this connection is to return an amount of the evacuated gases to the vacuum chamber 1. As the gases are not extraneous, the liquid in the vacuum 1 are not contaminated.

During the gas sampling process the mode of operation switches to sampling mode. The closing valve 30 is closed during sampling and only the gas being evacuated from the vacuum chamber 1 is pumped into the vessel 25. After a specific period of time the gas present in the vessel 25 corresponds to the gas present in vacuum chamber 1. The gas sample is extracted through the sampling valve 33.

A second sensor 11 for measuring the liquid level is further provided in the vacuum chamber 1. A certain minimum liquid level is required in the vacuum chamber 1 to avoid cavitation in the pump 6. The second sensor 11 controls a level control valve 20 ensuring that specific minimum and maximum liquid levels are maintained.

A third sensor 13 is arranged on the vacuum chamber 1 and measures the pressure therein. This sensor further controls the pressure control valve 27 to ensure that a maximum vacuum is maintained in the vacuum chamber 1. A vacuum gauge 15 is arranged adjacent the third sensor 13 to provide a reading of the pressure in the vacuum chamber 1. As mentioned above, the pressure in the vacuum chamber 1 draws out the liquid from the reservoir 12 and through the filter cartridge 8.

The control of the vacuum and the liquid flow is generally coordinated such that a state of equilibrium is generated in the vacuum chamber 1 at the same time as an acceptable liquid foam level is obtained and the pressure in the vacuum chamber 1 is sufficiently low to remove the water from the liquid.

In addition to the above pumps, sensors and valves a number of other components form part of the device. A throttle valve 14 is provided in the feed conduit 4 to reduce the liquid flow from the reservoir 12 to the vacuum chamber 1. A closing valve 21 is further provided in the feed conduit 4, said valve shutting-off the liquid flow from the reservoir 12 at the function "stop". The flow in the feed conduit 4 also has to be restricted to be below the pump capacity of the oil pump 6. A level control valve 20 is provided in the return conduit 5 for controlling the operation level of the liquid in the vacuum chamber 1.

Further, a manually operated closing valve 19 is provided in the return conduit 5. Jointly with a level control valve 20 the manually operated closing valve 19 may be used to shut off the liquid during removal of the pump 6. A discharge valve 18 is used to evacuate liquid from the vacuum chamber 1 during maintenance. The vacuum pump 7 is provided with an oil level switch 17 switching off the vacuum pump 7, if the oil level in the sump of the vacuum pump becomes too low. By shutting off the vacuum pump 7 the evacuation of liquid from the reservoir 12 is stopped. A float valve 16 is provided to allow the foam-reducing gas to enter the vacuum chamber 1 and further to allow another gas, eg atmospheric air, to enter the vacuum chamber 1. Another function of the float valve 16 is to prevent liquid from flowing into the vacuum pump 7. A pressure relief valve 29 is arranged between the vacuum chamber 1 and the return conduit 5, said valve returning increasing amounts of the liquid to the vacuum chamber 1, when the level control valve 20 is shut off during operation of the oil pump 6. The return conduit 5 is further provided with a sampling point 28 allowing for a liquid sample to be extracted for analysis.

An embodiment of the invention is described above. Many modifications can be carried out without thereby deviating from the scope of the invention. The foam-reducing gas may for instance be atmospheric air or another gas applicable for that purpose. As mentioned above the gas in the transformer oil is used to check the condition of the transformer. If the foam-reducing gas is a known inert gas such as Argon, the gas is easily excluded in a future analysis. Another option is to use the gas already evacuated from the vacuum chamber, this gas having substantially the same composition as the gas to be tested and thus does not constitute a contamination.

The invention claimed is:

1. A device having a flow arrangement for purifying a liquid comprising oil, said liquid contained in an oil reservoir of a transformer, said flow arrangement comprising:
- a vacuum chamber having an inflow opening and an outflow opening communicating with the liquid in the transformer oil reservoir through a feed conduit and a return conduit, respectively,
- a pump arranged in the return conduit for pumping the liquid out of the vacuum chamber through the outflow opening and returning the liquid to reservoir through the return conduit,
- a vacuum pump connected with the vacuum chamber for maintaining a predetermined low pressure in the vacuum chamber,
- a filter cartridge arranged in the vacuum chamber and provided with a plurality of filter elements, each of said filter elements having a flow side communicating with a central passage and a flow side opening into the periphery of the filter cartridge, the central passage of the filter cartridge communicating with the inflow opening of the vacuum chamber, the liquid traversing across an inner face to an outer face of the filter cartridge to allow a maximum amount of the liquid to be exposed to the pressure in the vacuum chamber to boil off a liquid contaminant of the liquid,
- a vessel in fluid communication with the vacuum chamber, adapted for receiving and containing a gas removed from the liquid, and
- a first sensor provided in the vacuum chamber and adapted for monitoring a liquid foam level in the vacuum chamber, and
- a pressure equalizing valve adapted for controlling a supply of the gas contained by the vessel to the vacuum chamber in response to the first sensor to counteract formation of liquid foam.

2. The device according to claim 1, further comprising a pressure control valve in fluid communication with the vessel and the vacuum chamber, the equalizing valve and the pressure control valve controlling the supply of the gas contained by the vessel to the vacuum chamber.

3. The device according to claim 2, further comprising a second sensor and a third sensor, both disposed in the vacuum chamber, the second sensor recording the liquid level and controlling the pump, the third sensor recording the pressure in the vacuum chamber and controlling the pressure control valve.

4. The device according to claim 1, further comprising a sampling valve in fluid communication with the vessel, which samples the gas removed from the liquid for performing an analysis.

* * * * *